May 26, 1931.  M. LASHER  1,806,631
FRUIT HOLDER
Filed June 23, 1930

Inventor
Martha Lasher

By Clarence A. O'Brien
Attorney

Patented May 26, 1931

1,806,631

UNITED STATES PATENT OFFICE

MARTHA LASHER, OF MIAMI, FLORIDA

FRUIT HOLDER

Application filed June 23, 1930. Serial No. 463,329.

This invention relates to new and useful improvements in fruit holders and aims to provide a highly novel, efficient and useful holder for halves of grape fruit, oranges, and the like to permit the same to be properly eaten at the table without any liability of the same dropping from the table and without requiring unusual difficulty on the part of the eater to hold the fruit while scooping the same from its skin.

In carrying out the present invention there is provided a holder that may be constructed of high grade or inexpensive metal and that is further so constructed as to be readily adjusted for holding fruit of various sizes, and this in a very secure manner to preclude any possibility of the fruit dropping therefrom.

In the drawings wherein like reference characters indicate corresponding parts in both of the views.

Figure 1:
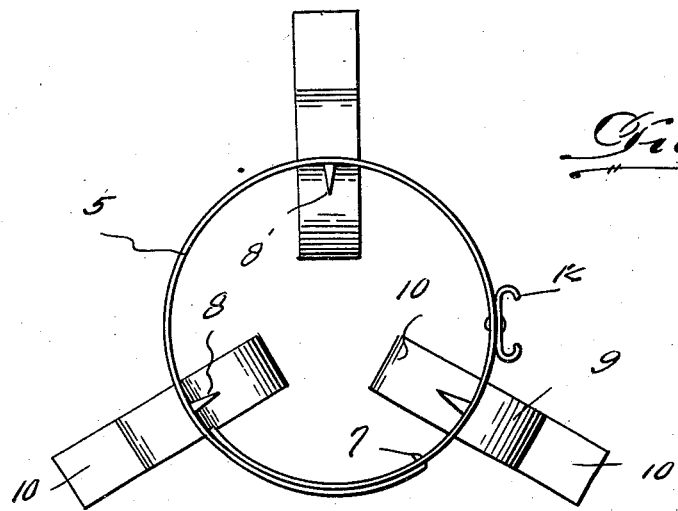
Figure 1 is a top plan view of my improved fruit holder.
Figure 2:
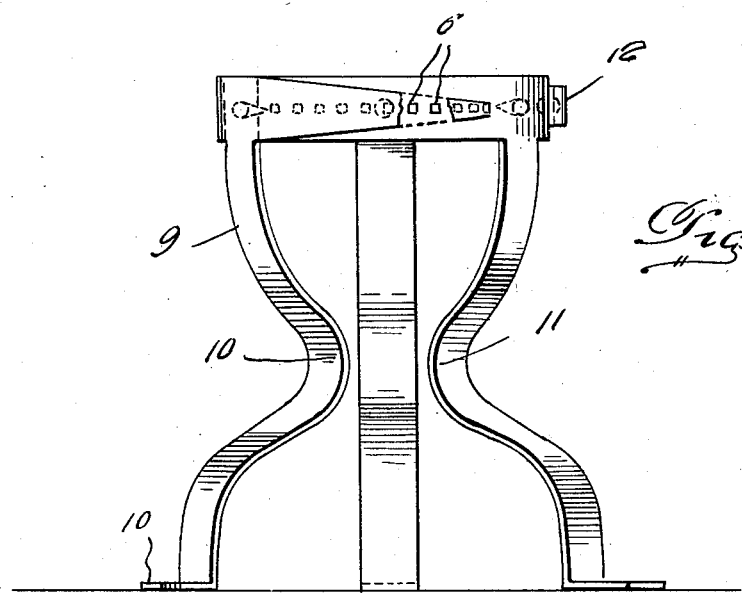
Figure 2 is a side elevation thereof.

Now having particular reference to the drawings, my novel holder consists of a spring metal band 5, the length of the material forming the same being such that the ends thereof will have considerable overlapping relation as clearly disclosed. At one end of this band the same is formed with spaced openings 6, while the edges at the opposite end of the band are of inwardly tapering formation as indicated in Figure 2, the extremity of this end being bent inwardly to provide a hook 7 for engagement in any predetermined one of said openings depending upon the size of the fruit to be arranged therein.

Furthermore the inner surface of this band 5 is formed or equipped at predetermined spaced points with inwardly extending tines 8 for engagement within the fruit to preclude turning of the same within the band or in fact movement of the same in any direction.

At predetermined spaced points at the lower edge of the band 5 there is provided depending supporting legs 9 preferably three in number, the lower ends of these legs being bent outwardly at right angles to provide supporting teeth 10. Intermediate the ends of these legs the material forming the same are bent inwardly in relatively wide curves to provide knees 11 upon which the section of fruit disposed within the band 5 will rest, it being understood that the upper edge of the fruit will be disposed substantially flush with the upper edge of said band.

The outer surface of the band may be and preferably is provided with any predetermined character of spoon holder 12.

It will thus be seen that I have provided a highly novel, useful and inexpensive holder for fruits, such as grape fruit, oranges and the like that is well adapted for all the purposes heretofore designated, and even though I have herein shown and described the invention as consisting of certain detail structural elements it is nevertheless to be understood that some changes may be made therein without affecting the spirit and scope of the appended claim.

Having thus described the invention, what I claim as new is:

In a fruit holder of the character described, a split band, one end of the said band being tapered to a point, the opposite end portion of the band being formed with a plurality of longitudinally spaced openings into one of which the pointed end portion of the tapered end of the band may be bent for clamping the band to the fruit, prongs projecting inwardly from the inner face of the band, and leg members constructed of spring material and adapted to support the bands at their upper ends, the intermediate portions of each leg being curved inwardly to provide knees, the lower end portions of each leg being bent outwardly to provide a supporting foot.

In testimony whereof I affix my signature.

MARTHA LASHER.